United States Patent
Shitrit et al.

(10) Patent No.: US 10,162,961 B1
(45) Date of Patent: Dec. 25, 2018

(54) AUTOMATED PROCESS OF MANAGING AND CONTROLLING IDENTITIES ON A REMOTE COMPUTER MACHINE

(71) Applicant: CyberArk Software Ltd., Petach-Tikva (IL)

(72) Inventors: Koby Shitrit, Haifa (IL); Tal Bazadka, Mazkeret Batya (IL); Eyal Ben Tov, Givatayim (IL)

(73) Assignee: CYBERARK SOFTWARE LTD., Petach-Tikva (IL)

( * ) Notice: Subject to any disclaimer, the term of this patent is extended or adjusted under 35 U.S.C. 154(b) by 0 days.

(21) Appl. No.: 16/049,020

(22) Filed: Jul. 30, 2018

Related U.S. Application Data

(62) Division of application No. 15/666,308, filed on Aug. 1, 2017.

(51) Int. Cl.
| | | |
|---|---|---|
| *G06F 21/00* | (2013.01) | |
| *G06F 21/46* | (2013.01) | |
| *H04L 29/06* | (2006.01) | |

(52) U.S. Cl.
CPC ............ *G06F 21/46* (2013.01); *H04L 63/083* (2013.01); *H04L 63/0876* (2013.01)

(58) Field of Classification Search
CPC .... G06F 21/46; H04L 63/083; H04L 63/0876
See application file for complete search history.

(56) References Cited

U.S. PATENT DOCUMENTS

| | | | |
|---|---|---|---|
| 7,814,558 B2 | 10/2010 | Chen et al. | |
| 8,995,981 B1 * | 3/2015 | Aginsky | G08C 17/02 455/419 |
| 9,003,195 B1 * | 4/2015 | Leininger | G06F 21/46 713/168 |
| 9,710,625 B2 * | 7/2017 | Lowe | H04L 63/062 |
| 2003/0005299 A1 * | 1/2003 | Xia | G06F 21/31 713/171 |
| 2007/0056031 A1 | 3/2007 | Sivaramakrishna Iyer | |

(Continued)

OTHER PUBLICATIONS

Extended European Search Report for corresponding EP Application No. 17188912.4 dated Mar. 21, 2018 (7 pgs.).

*Primary Examiner* — Morshed Mehedi
(74) *Attorney, Agent, or Firm* — Finnegan, Henderson, Farabow, Garrett & Dunner LLP

(57) ABSTRACT

The disclosed embodiments include systems and methods for managing an authentication credential of an account of a machine of a computer system via a remote connection with the machine. A method includes accessing in the computer system, at least one credential parameter for an authentication process for the account of the machine, the at least one credential parameter being included in an authentication file associated with the computer system. The method also includes determining a password complexity rule for the account based at least on the at least one accessed credential parameter, thereby enabling automatic generation of a password consistent with the determined password complexity rule for a user associated with the account of the machine, and determining a credential management protocol, based on interaction with the machine via the remote network connection, thereby enabling updating a password for the account at the machine based on the automatically generated password.

23 Claims, 9 Drawing Sheets

(56) References Cited

U.S. PATENT DOCUMENTS

| | | | |
|---|---|---|---|
| 2007/0208853 A1* | 9/2007 | Yang | G06Q 10/107 709/225 |
| 2007/0261103 A1* | 11/2007 | Viavant | G06F 21/40 726/2 |
| 2010/0325717 A1* | 12/2010 | Goel | H04L 63/102 726/11 |
| 2011/0239267 A1 | 9/2011 | Lyne et al. | |
| 2011/0314515 A1* | 12/2011 | Hernoud | H04W 12/06 726/2 |
| 2013/0086655 A1* | 4/2013 | Karp | G06F 21/45 726/6 |
| 2013/0174241 A1* | 7/2013 | Cha | H04L 63/0815 726/7 |
| 2014/0237564 A1* | 8/2014 | Dudziak | H04L 63/08 726/6 |
| 2015/0172321 A1* | 6/2015 | Kirti | H04L 63/20 726/1 |
| 2015/0178493 A1* | 6/2015 | Liu | G06F 21/45 726/6 |
| 2015/0248544 A1* | 9/2015 | Fadida | G06F 21/31 726/4 |
| 2015/0302462 A1* | 10/2015 | Chan | G06Q 30/0243 705/14.42 |
| 2016/0171208 A1* | 6/2016 | Matthiesen | G06F 21/45 726/6 |
| 2016/0212141 A1* | 7/2016 | Banerjee | H04L 63/0846 |
| 2017/0111335 A1* | 4/2017 | Hibbert | H04L 63/083 |
| 2017/0289796 A1* | 10/2017 | Raleigh | H04W 12/04 |
| 2017/0302648 A1* | 10/2017 | Ferrydiansyah | H04L 63/083 |

* cited by examiner

AUTOMATED PROCESS OF MANAGING AND CONTROLLING IDENTITIES ON A REMOTE COMPUTER MACHINE This application is a divisional application of U.S. patent application Ser. No. 15/666,308, filed on Aug. 1, 2017, the entire contents of which are incorporated herein by reference.

BACKGROUND

Enterprise computer systems typically include numerous machines or computer devices, such as server computers, network computing devices, end-user computer devices associated with numerous users, and other computer devices capable of accessing an enterprise's computer system. The users associated with an enterprise computer system may be associated with one or more accounts, and the user accounts may vary in the type or nature of access to system resources that may be permitted for a user within the computer system. The machines in an enterprise computer system may also include one or more accounts, some of which may be user accounts uniquely associated with the machine. The machine and/or user accounts may be assigned or associated with an authentication credential (e.g., password, key, token) used to authenticate the machine and/or user of the machine to enable access to local resources of the machine and system resources controlled or managed by the enterprise computer system. The machine may be configured to enforce or provide local authentication procedures for the accounts associated with the machine (e.g., local logon) based on a credential associated with a user, as well as to enable or support subsequent authentication procedures required by the enterprise computer system.

Many enterprise computer systems include technologies to authenticate machines and users accessing resources of an enterprise computer system, including accounts associated with the machines and users. Some enterprise computer systems may include, for example, systems for implementing enterprise-wide policies for controlling or managing accounts and authentication credentials associated with accounts, as well as for managing access to network resources. An enterprise-wide policy may define requirements for authentication credentials, such as a length of a password, or a requirement to periodically change the password. In some enterprise computer systems, a user credential used for a local logon process at a machine may also be used to access other computer system resources including information or functionality sensitive to an enterprise. Some machines may also enable local access to sensitive information on the machine. Thus, some enterprise computer systems also manage the use or provisioning of authentication credentials of one or more machines and for users of those machines to ensure sufficient security measures are implemented.

Enterprise computer systems commonly include a network administrator having privileges allowing it to access and control the plurality of machines associated with the enterprise computer system. In some systems, a network administrator may manually access a machine using a privileged or superuser/root/administrator account. Requiring a superuser to manually access machines of a computer system is not practicable, however, for managing large, complex computer systems. Indeed, due to the numerous varying types of applications, machines, and user accounts that may be implemented in an enterprise computer system, and the frequency with which the machines may change and new machines may be added to the computer system, significant complications arise when trying to manually manage policies and access for the varying types of machines and accounts.

Thus, there is a need for technological solutions to enable automation of at least some aspects of account and credential management of machines in computer systems. In particular, there is a need for technological solutions to ensure that the numerous machines in a computer system are configured according to an appropriate enterprise policy for its accounts and, moreover, there is a need for technological solutions to automate processes for updating or changing authentication credential policies and authentication credentials for each of the numerous machines and users of the computer system. Because different machines may require unique protocols for effecting an update of an account or an authentication credential of the machine, and because different accounts associated with a machine may have different credential requirements, there is also a need for technological solutions to autonomously identify or determine the various authentication credential policies and protocols for the different machines and accounts to thereby enable the automated processes for managing and controlling accounts and authentication credentials for the accounts.

SUMMARY

The disclosed embodiments describe systems and methods for managing an authentication credential of and determining a credential management protocol for an account of a machine of a computer system via a remote connection with the machine.

A disclosed embodiment includes a method for managing an authentication credential of an account of a machine of a computer system via a remote connection with the machine. The method includes accessing in the computer system, at least one credential parameter for an authentication process for the account of the machine, the at least one credential parameter being included in an authentication file associated with the computer system. The method also includes determining a password complexity rule for the account based at least on the at least one accessed credential parameter, thereby enabling automatic generation of a password consistent with the determined password complexity rule for a user associated with the account of the machine, and determining a credential management protocol, based on interaction with the machine via the remote network connection, thereby enabling updating a password for the account at the machine based on the automatically generated password.

According to a disclosed embodiment, the method also includes automatically generating a password consistent with the determined password complexity rule for a user associated with the account of the machine, the password being configured to enable the user to access at least one access-controlled resource associated with the machine, establishing a remote network connection with the machine, and interacting with the machine, via the remote network connection, thereby updating a password of the account of the machine with the automatically generated password based on the determined credential management protocol.

According to a disclosed embodiment, the at least one credential parameter is included in an authentication file stored on the machine, the method further comprising querying from the machine, via the remote network connection, the at least one credential parameter, and wherein storing the generated password on the machine includes modifying the authentication file to replace a prior password with the generated password.

According to a disclosed embodiment, the method also includes determining whether the password complexity rule is consistent with a predetermined password complexity policy, and when the password complexity rule is not consistent with the predetermined password complexity policy, modifying, via the remote network connection, at least one accessed credential parameter included in the authentication file stored on the machine, thereby modifying the password complexity rule.

According to a disclosed embodiment, establishing the remote network connection includes accessing the machine using a root account.

According to a disclosed embodiment, the password complexity rule identifies at least one minimum requirement of a password for the account, including a requirement for a minimum number of characters, digits, uppercase characters, lowercase characters, or valid special characters.

According to a further disclosed embodiment, the method also includes determining a plurality of account types of the machine, each account type having different privileges in the computer system, determining a password complexity rule for each of the plurality of account types of the machine, and modifying a password complexity rule for at least one of the plurality of account types based on the privileges associated with the at least one of the plurality of account types.

A disclosed embodiment may also include a method of determining a credential management protocol for an account of a machine of a computer system via a remote network connection to the machine. The method includes establishing a remote network connection with the machine, running, via the remote network connection, a plurality of credential management process commands on the machine, determining, for one or more of the plurality of credential management process commands, that a received response from the machine is consistent with an expected response based on the respective credential management process command, and for a received response from the machine that is determined to be consistent with an expected response, generating, according to the received response and the respective credential management process command, a credential management protocol state machine indicative of a process for managing a credential associated with the account at the machine.

According to a disclosed embodiment, the process for managing a credential includes a change password process and the plurality of credential management process commands are configured to determine a change password protocol associated with the account at the machine.

According to a disclosed embodiment, at least one of the plurality of credential management process commands is configured to determine at least one credential parameter indicative of a password complexity rule associated with the account. The at least one of the plurality of credential management process commands may include a query for a file stored on the machine including information indicative of the password complexity rule.

According to a disclosed embodiment, the method includes determining whether the password complexity rule is consistent with a predetermined password complexity policy, and when the password complexity rule is not consistent with the predetermined password complexity policy, modifying, via the remote network connection, the at least one credential parameter included in the file stored on the machine, thereby modifying the password complexity rule.

According to a disclosed embodiment, the method includes determining a plurality of account types of the machine, each account type having different privileges on the computer system.

According to a disclosed embodiment, the running, determining that a received response from the machine is consistent with an expected response, and generating, are performed for each of the plurality of determined account types of the machine.

According to a disclosed embodiment, the method also includes generating, in an automated process, a set of instructions based on the credential management protocol state machine for effecting, on the machine, a change password process for the account, and changing a password stored on the machine, via the remote network connection and according to the set of instructions, the password being configured to enable a user associated with the account to access at least one resource associated with the machine.

According to a disclosed embodiment, the set of instructions is executable by a plugin for a credential manager, the plugin configured to perform the change password process for the account via the remote network connection.

In a further disclosed embodiment, a non-transitory computer readable medium may include a set of instructions executable by a processor to perform operations for determining a credential management protocol for an account of a machine of a computer system via a remote connection with the machine. The operations may include establishing a remote network connection with the machine, running, via the remote network connection, a plurality of credential management process commands on the machine, determining, for one or more of the plurality of credential management process commands, that a received response from the machine is consistent with an expected response based on the respective credential management process command, and for a received response from the machine that is determined to be consistent with an expected response, generating, according to the received response and the respective credential management process command, a credential management protocol state machine indicative of a process for managing a credential associated with the account of the machine. The operations may also include generating, in an automated process, a second set of instructions based on the credential management protocol state machine for effecting, on the machine, the change password process for the account.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
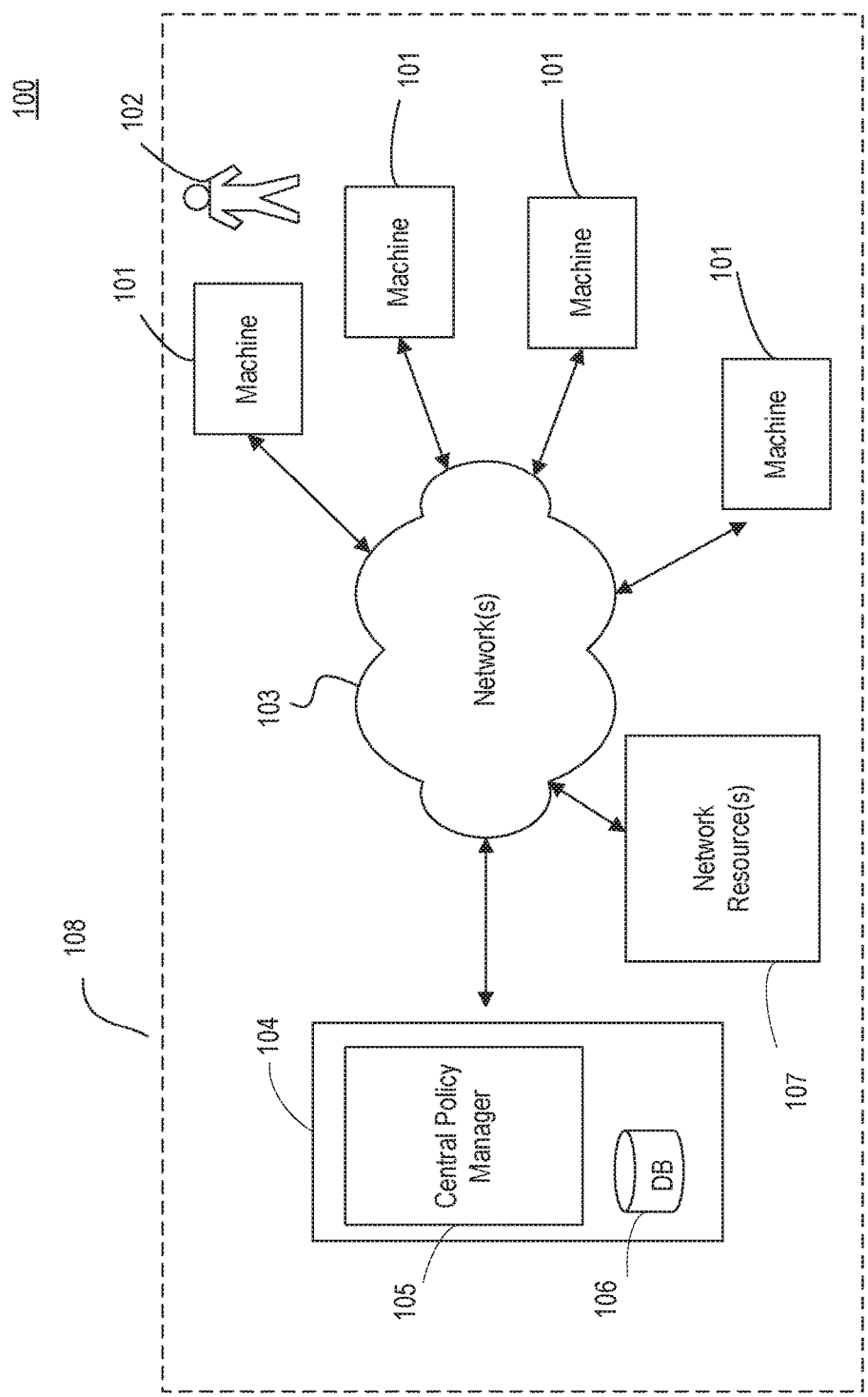
FIG. 1 is a block diagram of an example system, in accordance with disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The disclosed embodiments include automated processes for the discovery of authentication credential policies and credential management protocols for an account, or groups of accounts, of a machine in a computer system. The automated processes of the disclosed embodiments may be carried out in an autonomous manner over a remote communication session with a machine without need for human intervention or user input. Because each machine and/or account of the machine may require unique authentication credential policies and/or a credential management protocol, the disclosed embodiments thus include computer-implemented processes for interacting with a machine during a remote communication session to learn or discover authentication credential policies stored on and/or enforced by a machine, and to learn or discover a particular credential management protocol for each of one or more accounts associated with the machine.

A credential management protocol may include a protocol, series of steps, operations, or commands, for managing any aspect of a credential, such as to reset, change, disable, and assign a credential for an account. A credential management protocol, may include for example, a process (e.g. set of commands) for changing a user credential (e.g., password) associated with an account of the machine. As a result of the discovery process, a programmable credential manager service may be enabled to thereby implement an automated process for effecting changes or updates to a credential policy and/or a credential based on a credential management protocol of the machine. In particular, in some embodiments, the programmable credential manager service may interact remotely with a machine via a remote network connection by sending one or more commands directed to discovering a credential policy and/or a credential management protocol of the machine. The credential manager service may be able to ascertain a credential policy and/or develop a credential management protocol state machine based on the prompts received from the machine. In some embodiments, the credential manager service may be configured to automatically generate a set of programmable instructions for an automated process for effecting operations for updating or changing credential policies and authentication credentials at the machine via the remote network connection. The disclosed techniques may be implemented for generating a plurality of automated processes for effecting operations for updating or changing credential policies and authentication credentials for each of a variety of machines in a computer system implementing various credential management protocols.

In the disclosed embodiments, a computer system may refer to any one machine or a plurality of machines. In some embodiments, the one or more machines of a computer system may be physically connected or otherwise in communication via one or more networks and combinations of networks. The one or more machines of a computer system may be part of an enterprise computer system, such as a system implemented by, managed by, or otherwise including resources associated with an enterprise or organization. The one or more machines of an enterprise computer system may be located in geographic proximity, such as an office building, or otherwise widely distributed across a number of office buildings or sites, and may also include machines operating in a cloud environment.

In the disclosed embodiments, a machine may refer to an execution environment, including a physical hardware implementation and an operating system, such as a Windows™ OS, Apple OS™, or Unix-based OS. For example, a machine may include any one or more of various types of computer or computing devices, such as server computers, network computer devices, processing devices, end-user computer devices associated with numerous users, and other computer devices capable of accessing one or more resources in a computer system, such as an enterprise computer system. In some embodiments, a machine may refer to an application or software execution environment, such as a virtual hardware implementation including a virtual machine implementation or container implementation.

In the disclosed embodiments, an account may be a user account, machine account, application account, or any other type of account that can be established and associated with a particular user, machine, or application in a computer system. Examples include operating system user accounts (e.g., in Microsoft Windows™, Apple OS™ versions, Linux accounts, etc.), and accounts created for the purpose of running machines or applications (e.g., in a machine-to-machine or application-to-application communications environment). One or more accounts may have varying levels of access rights associated with them, ranging from so-called "superuser" accounts with broad access rights (potentially root access privileges), administrator accounts with varying degrees of access rights, executive or VIP accounts with varying degrees of access rights, regular user accounts with generally narrower access rights, and guest or unknown accounts with even less access rights.

In the disclosed embodiments, an account may be associated with a credential used to authenticate the account or a user of the account. Examples of credentials include passwords, SSH keys, symmetric or asymmetric (e.g., public/private) keys, and other types of cryptographic data or access tokens, etc. In some embodiments, these credentials are stored on the machine or included within an application on the machine for use in communicating with other machines or network resources in a computer system and for authenticating users having accounts associated with the machine itself. The disclosed embodiments include automated processes for managing such credentials associated with an account of the machine and credential policies enforced on the machine.

In the disclosed embodiments, an authentication credential policy includes any one or more requirements or parameters for an authentication credential that is enforced by a machine. In some embodiments, an enterprise may enforce the same or different credential policy that is enforced by a machine. Example credential requirements or credential parameters include a type of credential that is required, a complexity rule associated with the credential (e.g., a length and other requirements for a password, etc.), a period of time defining usability of a credential, etc. Other example parameters are contemplated by this disclosure, some of which are described below. In the disclosed embodiments, a combination of the one or more credential parameters may form an authentication credential policy. An authentication credential policy may be specific to a particular machine and an account on the machine. In some embodiments, an authentication credential policy may be specific to one or more account of an enterprise system.

Reference will now be made in detail to the disclosed embodiments, examples of which are illustrated in the accompanying drawings.

FIG. 1 is a block diagram of an example system 100 for managing an authentication credential of and determining a credential management protocol for an account of a machine of a computer system via a remote connection with the machine, consistent with disclosed embodiments. As shown, system 100 includes a credential manager 104 configured to perform aspects of disclosed processes. In some disclosed embodiments, credential manager 104 may connect, via a remote connection over network 103, with a plurality of machines 101 to learn or discover authentication credential policies stored on or enforced by a machine 101, and to learn or discover a particular credential management protocol for each of one or more accounts associated with the machine 101. Credential manager 104, machines 101, and network 103 may be provided as part of a computer system 108 that includes a plurality of network resources 107 that may be accessible to one or more of credential manager 104 and machines 101.

As discussed above, computer system 108 may be part of an enterprise, organization, or company implemented or managed system including a plurality of enterprise specific network resources 107. Network resources 107 may include hardware devices, such as servers, printers, storage systems, as well as applications, files and others types of data, including enterprise specific sensitive data that may be located throughout an enterprise on servers of various types and in a single geographic location or widely distributed, including in the cloud.

As discussed above, machines 101 may refer to any implementation or device with data processing and network connectivity capabilities. Examples of such machines may include servers, desktop computers, cloud-computing virtual machines or containers, laptops, smartphones, tablets, personal digital assistants, enterprise digital assistants, smart cards, smart watches, smart bands, smart headphones, computer-embedded clothing, car-computers and other in-vehicle computer equipment, Internet-of-Things (IoT) devices, etc. In various embodiments, machines 101 may have one or more accounts that are associated with them, with applications installed on them, or with users who use them, such as a user 102. The one or more accounts of a machine 101 may enable one or more users to access the machine and/or resources stored locally on the machine, such as via a local logon process. Machines 101 may include an operating system (e.g., Windows™, Apple OS™, or Unix-based, etc.) configured to enforce local logon processes for authenticating a user 102 based on one or more credentials stored locally on the machine. The one or more accounts of a machine 101 may also enable the machine or a user 102 of the machine to access network resources 107. The one or more accounts may be configured with varying privileges to provide machine 101 and/or user 102 access to network resources 107 or to subsets of network resources 107. An account may also specify what type of access may be allowed per machine 101 and/or user 102 of a machine.

The example system 100 also includes a credential manager 104, which may be referred to as an authentication or management server, and which is configured for communicating with machines 101 to implement, control, and enforce credential management policies for machines 101 or user 102 within computer system 108. Credential manager 104 may include a central policy manager (CPM) 105, and a database 106. CPM 105 and/or database 106 may be various types of memory or storage systems, and may be implemented for storing account and credential information for each of machines 101 and/or a plurality of users 102 of the computer system 108. Credential manager 104 may be configured to execute processes for learning and discovering credential policies and credential management protocols according to disclosed embodiments and for generating instructions for effecting automated processes for updating or changing a credential policy or authentication credential at a remote machine 101. In the disclosed embodiments, CPM 105 and/or database 106 may manage all the information needed for credential manager 104 to generate the instructions for effecting automated processes for updating or changing a credential policy or authentication credential at a remote machine 101, including information concerning one or more accounts of a machine, the credential policies for each of the one or more accounts, and credential management protocol state machines for effecting one or more updates or changes to a credential at the machine. Credential manager 104 may interact with CPM 105 and/or database 106 to include updates for new information or changing information learned or resulting from the disclosed discovery processes described in further detail below.

Credential manager 104 may be implemented as one or more of various types of servers, whether a single server machine, a group of common server machines, or a server farm. In addition to performing the disclosed processes, credential manager 104 may also be configured to perform other kinds of authentication and management functions such as authentication of machines 101 and/or user 102, policy management, monitoring access of network resources, etc. For example, in some embodiments, credential manager 104 may be configured to authenticate machines 101 and user(s) 102, as well as accounts of machines 101 and user(s) 102 associated therewith. In addition to performing authentication, or in the alternative, credential manager 104 may manage privileged access to certain resources, such as privileged resources, among network resources 107. In some embodiments, this may involve applying a policy to determine whether an account seeking to access a privileged resource or other network resource 107 should be granted access to such resource. In some embodiments, credential manager 104 is managed and controlled by one or more system administrator or superuser/root accounts provided with access privileges for controlling and managing computer system 108 including machines 101.

As shown in FIG. 1, credential manager 104 is configured for communicating (directly or indirectly) with machines 101 of computer system 108 via network 103. Network 103 may implement one, or a combination, of wired or wireless network connectivity technologies, such as cellular, WiFi, Bluetooth™, radio frequency, USB™, Ethernet, wireless mesh networking, or any other standardized or proprietary network communications technology. Credential manager 104 and machines 101 therefore may include integrated or external network communications interfaces designed to support communications using any of these or other communications technologies. Network 103 may be an on-premises network (e.g., local area network), a public network, or cloud network (e.g., private cloud, public cloud, or hybrid cloud network), or a combination of these types of networks. In some embodiments, machines 101, credential manager 104, and network resources 107 may be located in the same network, in different networks, or they may be located in overlapping networks. Network 103 may be incorporated entirely within computer system 108 and may be dedicated to an enterprise, for example. Network 103 may also include aspects of a private or public cloud network and platform or other public networks.

Figure 2:
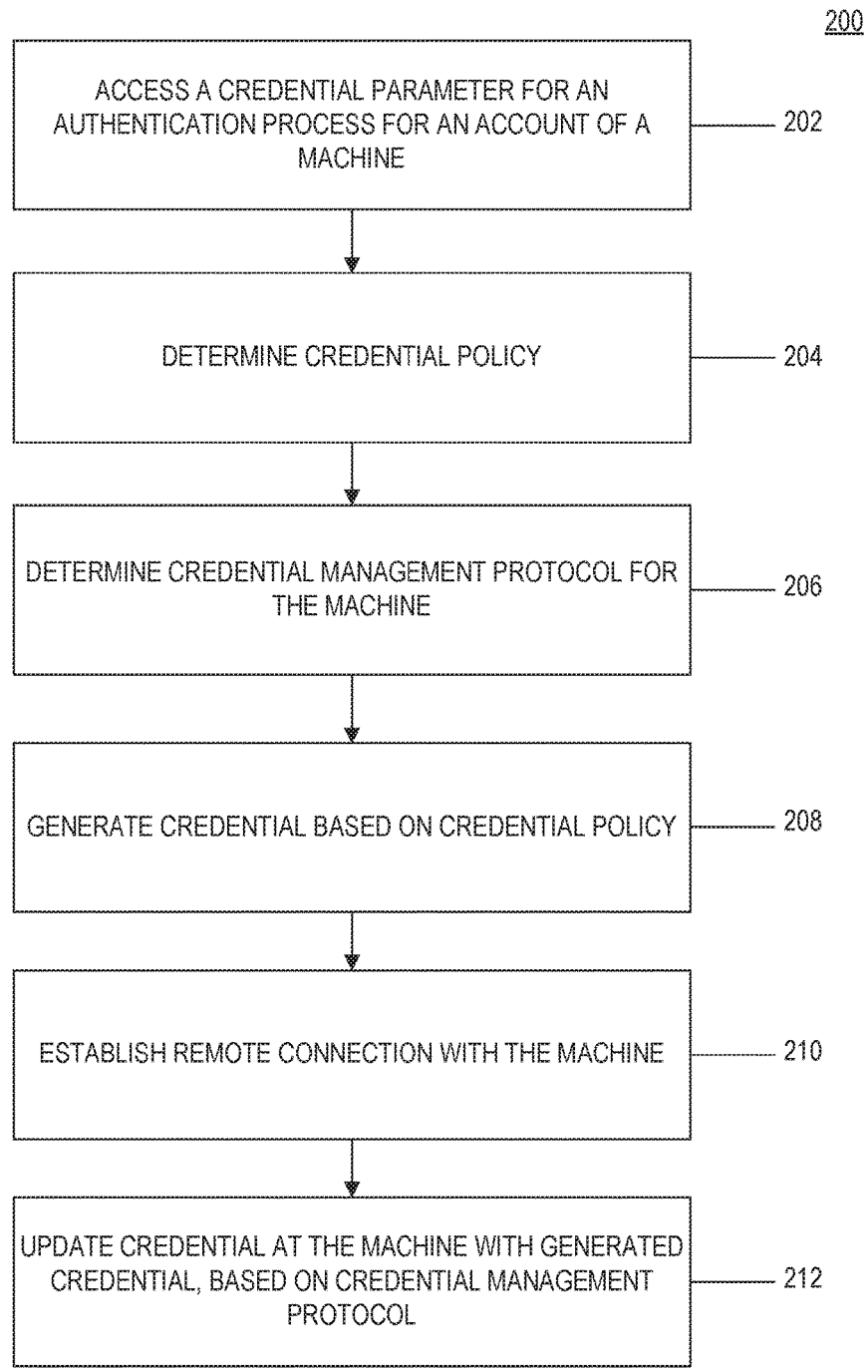
FIG. 2 is a flowchart depicting an example process for managing an authentication credential of an account of a machine, in accordance with disclosed embodiments.

FIG. 2 includes a flowchart depicting an example process 200 of the disclosed embodiments that may be performed in part by credential manager 104, and aspects thereof, as described above. While the embodiments are disclosed as being performed by a credential manager 104, other components of a computer system 108, or other third-party components, may be implemented to perform aspects thereof. Moreover, more than one component may, in combination, perform the processes of the disclosed embodiments.

Process 200 may be directed to or performed with respect to a particular machine 101 of a plurality of machines 101 of a computer system 108. Process 200 may also be directed to or performed with respect to a particular account of the particular machine 101, or for each account or account type of the particular machine 101. The machine 101 and/or account may be selected or identified by credential manager 104 on demand, such as based on an input or selection from a system administrator, or alternatively, may be selected or identified based on a policy of the computer system 108, or based on detection of some event associated with the machine 101. For example, process 200, or aspects thereof, may be performed for each new machine 101 connected to computer system 108. Process 200, or aspects thereof, may also be performed for each machine or a subset of machines 101 of computer system 108 on a scheduled or periodic basis, or in response to a detection of a threat or vulnerability associated with machine 101 or other machines of computer system 108, or based on any time-based or event-driven policy of computer system 108.

In the disclosed embodiments, credential manager 104 may also be configured to identify the accounts or types of accounts associated with any one particular machine. Alternatively, credential manager 104 may be configured to determine the machine or machines associated with any particular account. In some embodiments, CPM 105 may store a database (e.g., database 106) of information or records linking or associating an account with a machine. In some embodiments, CPM 105 may also be configured to interact with any particular machine to learn or discover an identity of those accounts associated with the machine.

As part of operation 202, credential manager 104 may access a credential parameter for an authentication process for an account of a particular machine 101 of computer system 108. The credential parameter may identify a requirement for an authentication credential used in the authentication process. The authentication process may include a local logon process, upon which a user having an account with the machine and being successfully authenticated may access local resources on machine 101. The authentication process may also include other processes for authenticating a machine, user or application for enabling access to one or more access-restricted resources on the local machine or other network resources 107 of computer system 108. The authentication process may require presentation of a credential, such as a password, token, key, certificate, or any other type of credential known or not yet known. In the disclosed embodiments, a credential parameter may include an identifier associated with the type or form of credential(s) needed for the authentication process. In some embodiments, a credential parameter may specify one or more requirements for a credential. In an example where the credential is a password, examples of credential parameters include specific or minimum or maximum requirements relating to, for example, a length of a password, number of lowercase letters, number of uppercase letters, number of numeric digits, and number of required special characters, as well as any other various requirements, such as a prohibition on use of certain characters, or prohibition on the use of other words or sequences, as well as restrictions on the number of characters that can be the same as a previous password, etc. A credential parameter may include any one of more of such example requirements, as well as others known in the art.

In some embodiments, a credential parameter may be stored on or managed by the CPM 105 or database 106 accessible to credential manager 104. The credential parameter may be stored in a database 106 managed by CPM 105, as part of an authentication file or other data uniquely associated with a particular machine 101, or may be stored as part of an authentication file defining credential parameters generally for groups of machines and groups of users. Thus, in some embodiments, credential manager may access a credential parameter by querying CPM 105 and/or database 106 using an identifier of a particular machine or user or user account to access a credential parameter associated with that machine, user, or account.

In some embodiments, the credential parameter may also be stored on machine 101 itself, as part of an authentication file accessible to an operating system for enforcing access policies, such as a local logon, for example. Thus, credential manager 104 may access the credential parameter from the machine 101 itself (e.g., as described with respect to FIG. 3), or any other component of computer system 108. Additionally, or alternatively, a credential parameter may be derived based on interaction with machine 101 itself (e.g., as described with respect to FIG. 4). In some embodiments, the operations described with respect to FIGS. 3 and 4 below may be performed after credential manager 104 determines that it does not have an authentication file credential parameter data on file for a particular machine or account, such as by first querying the CPM 105 or database 106 with an identifier associated with the machine or account. In some embodiments, the operations described with respect to FIGS. 3 and 4 may be performed even if credential manager 104 determines it has access to an authentication file for the machine and/or account, such as part of a periodic auditing of machines or accounts or based on detection of an event associated with the machine or account, or such as detection of a vulnerability associated with the machine or account or based on an operating system upgrade, for example.

As part of operation 204, credential manager 104 may determine one or more credential policies for an account on the machine. A credential policy may identify one or more credential parameters required for a machine or an account on the machine. In some embodiments, a credential policy includes a credential complexity rule. A credential complexity rule may include one or more rules defining the requirements for a valid credential to be used for authenticating a machine, user, or account. The one or more credential complexity rules may be determined, for example, based on one or more credential parameters identified, learned or discovered as a result of operation 202, which may include performance of processes 300 or 400, as described with respect to FIGS. 3 and 4 below. In some embodiments, credential manager 104 may be configured to parse the one or more credential parameters of an authentication file (accessed from CPM 105 or machine 101) to identify a credential policy including a credential complexity rule. Additionally, in some embodiments, credential manager 104 may analyze or interpret one or more responses or prompts received from interacting with machine 101, as described with respect to FIG. 4, for determining a credential policy. Alternatively, in some embodiments, credential manager 104 may determine that a credential policy or complexity rule is already associated with the machine or account as part of a file or other information retained by CPM 105 or database 106. Thus, as part of operation 204, credential manager 104 may access a credential policy or complexity rule from CPM 105 or database 106.

As part of operation 206, credential manager 104 may determine one or more credential management protocols for the machine. A credential management protocol may include any protocol or process for performing a credential management operation at the machine, including operations for changing a credential of an account associated with the machine, or changing a credential policy or complexity rule associated with the machine or an account of the machine. A credential management protocol may thus be indicative of a series of steps, such as a step-by-step process for performing and completing a credential management operation at the machine. In some embodiments a credential management protocol may be unique to a particular machine, or unique to an operating system associated with the machine. In some embodiments, a credential management protocol may include a series of commands or actions and associated prompts or responses for each of a plurality of steps for completing a credential management operation at a particular machine and for a particular account. In some embodiments, the series of commands and prompts correspond to machine commands for performing the credential management operation via a remote network connection, such as via a remote, command-line interface with the machine.

In some embodiments, a credential management protocol may be determined based on information associated with the machine and account, such as information stored or managed by CPM 105 or in database 106. In some embodiments, a credential management protocol may be determined based on interaction with the machine itself, such as is described with respect to FIG. 5 below. A credential management protocol may also be determined based on other obtained information, such as that obtained via an input by an administrator, for example, indicative of one or more steps for effecting a credential management operation at the machine.

In the disclosed embodiments, upon determining a credential policy (operation 204) for an account of a machine, and upon determining a credential management protocol for the machine (operation 206), a credential manager 104 may have obtained sufficient information to perform one or more automated processes for effecting changes or updates to a credential at a remote machine (as described further below with respect to operations 208, 210, and 212) and/or effect changes or updates to a credential policy at the remote machine (as described with respect to FIG. 9). In the disclosed embodiments, the one or more automated processes may be performed without any need for user input or interaction to effect the one or more updates or changes at the remote machine. The disclosed embodiments thereby enable a credential manager 104 to autonomously effect one or more updates or changes at each of a plurality of remote machines 101 in a computer system 108 and for each of one or more accounts of the plurality of remote machines.

In some embodiments, credential manager 104 may be enabled to thereby ensure consistency among credential policies enforced at each of the machines, identify machines that are not implementing credential policies consistent with enterprise-wide policies, automatically update or change credential policies for the plurality of machines, and automatically update, change, or rotate a credential associated with each of the accounts of the plurality of machines. Credential manager 104 may thereby be enabled to automatically implement and manage the provisioning of new or updated credentials for each of the accounts of the plurality of machines to respond to attacks on the computer system 108 or to enhance defenses against attacks consistent with prevailing cybersecurity practices. Credential manager 104 may also be configured to manage credentials for accounts at one or more machines on demand or upon any detection of events in the computer system 108 or according to any policy implemented in the computer system 108.

One such automated process enabled by the disclosed embodiments includes capability for central manager 104 to effect an update or change operation of a credential (e.g., password) stored at a machine for authenticating a user or user's account at the machine, for example. As part of operation 208, for example, credential manager 104 may generate a new or updated credential based on the one or more credential policies or credential complexity rules determined in operation 204. That is, in the disclosed embodiments, credential manager 104 may be configured to automatically generate a credential that meets the requirements for one or more credential policies enforced at a machine 101.

Credential manager 104 may be configured to generate a new or updated credential based on a random or pseudo-random algorithm, for example. Additionally, in some embodiments, where a credential is a password associated with a user account for authenticating a user to a machine 101, credential manager 104 may be configured to automatically generate a password based on one or more words, terms, digits or concepts or other secrets known to a user that may enable generation of a password that is easier to remember than a random assortment of characters, while meeting the determined credential policy (operation 204) and meeting other recognized cybersecurity practices for strong passwords, for example. In the disclosed embodiments, a credential may be generated according to various other techniques to be consistent with a determined credential complexity rule.

As part of operation 210, credential manager 104 may also be configured to establish a remote connection with a particular machine 101 to enable credential manager to perform one or more credential management operations at the machine 101. Credential manager 104 may establish a remote connection with a machine using various types of remote communication protocols (e.g., Microsoft's Remote Desktop Connection (RDC)™ or Remote Desktop Services (RDS)™, Microsoft's Remote Desktop Protocol (RDP)™, VNC™, Apple Remote Desktop™, and others). Further, in some embodiments, credential manager 104 may connect in an automated process to a remote machine using an SSH or Telnet communication protocol, for example, using an open source command-line connection tool such as Plink. In the disclosed embodiments, a command-line connection tool (e.g., Plink) may also be used to send one or more automated commands via the remote connection to perform the one or more credential management operations at the remote machine. Credential manager 104 may connect to the remote machine using a "root" account or other superuser/administrator account that has privileges for accessing the remote machine and making changes at the machine. In some embodiments, credential manager 104 may also connect to the remote machine using a known credential for a user account at the machine. Such a known credential may be stored in CPM 105 or database 106, for example.

Other tools, applications, and communication protocols are contemplated and may be used to enable credential manager 104 to connect to a remote machine and to send commands to perform one or more credential management operations at the machine. One such operation may be to update a credential at the machine with the credential generated in operation 208 (operation 212). In some embodiments, a credential management operation to update a credential may be automatically implemented by credential manager 104 based on a credential management protocol determined in operation 206. As described in greater detail below, with respect to FIG. 8, for example, credential manager 104 may issue one or more commands of the determined credential management protocol, via the remote connection with the machine, to provide, update, or change a credential (e.g., password) for an account at the remote machine.

Figure 9:
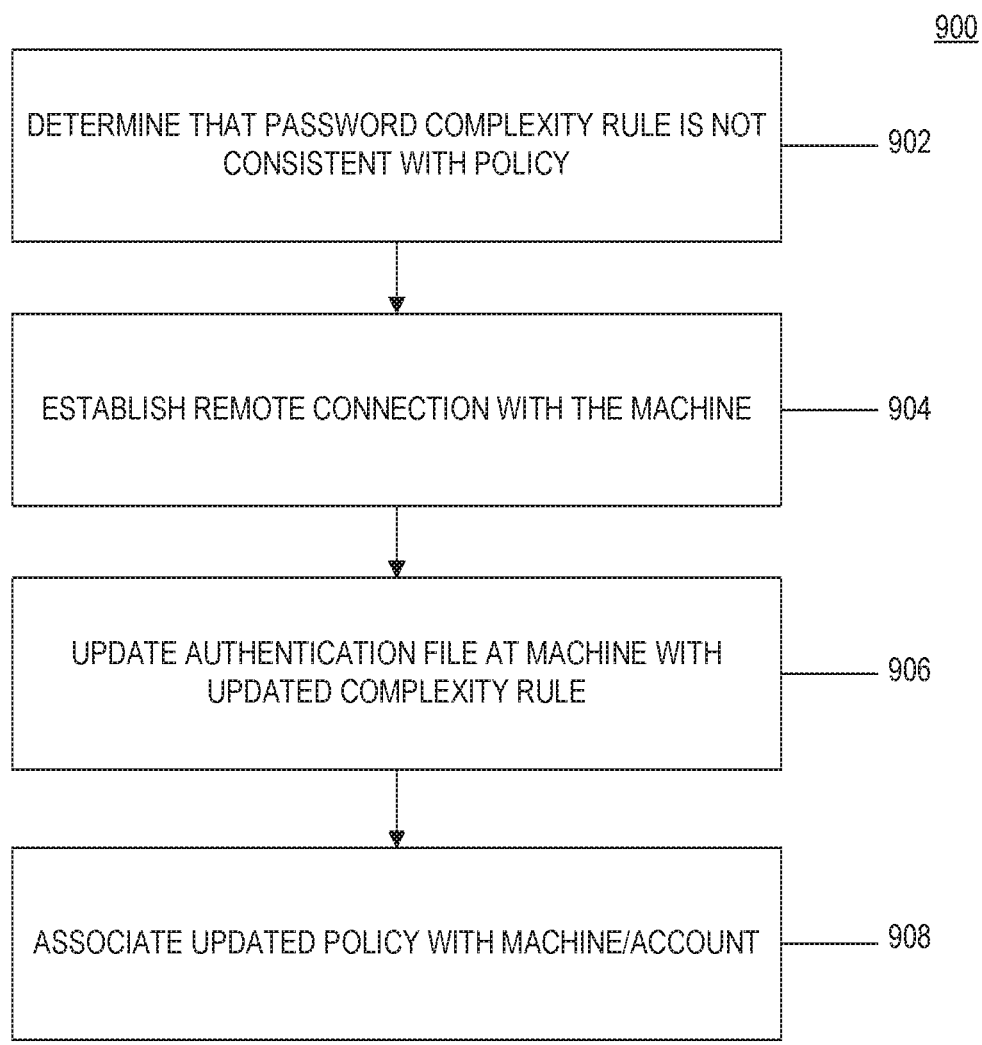
FIG. 9 is a flowchart depicting an example process for updating a credential policy for an account of a machine, in accordance with disclosed embodiments.

Further, as described in greater detail with respect to FIG. 9, credential manager 104 may also be configured to modify or update a credential policy including a credential complexity rule at the remote machine by updating one or more parameters of an authentication file at the remote machine, for example, via the remote connection with the machine. Credential manager 104 may be configured to perform such credential management operations autonomously based on information learned and discovered from the remote machine.

Figure 3:
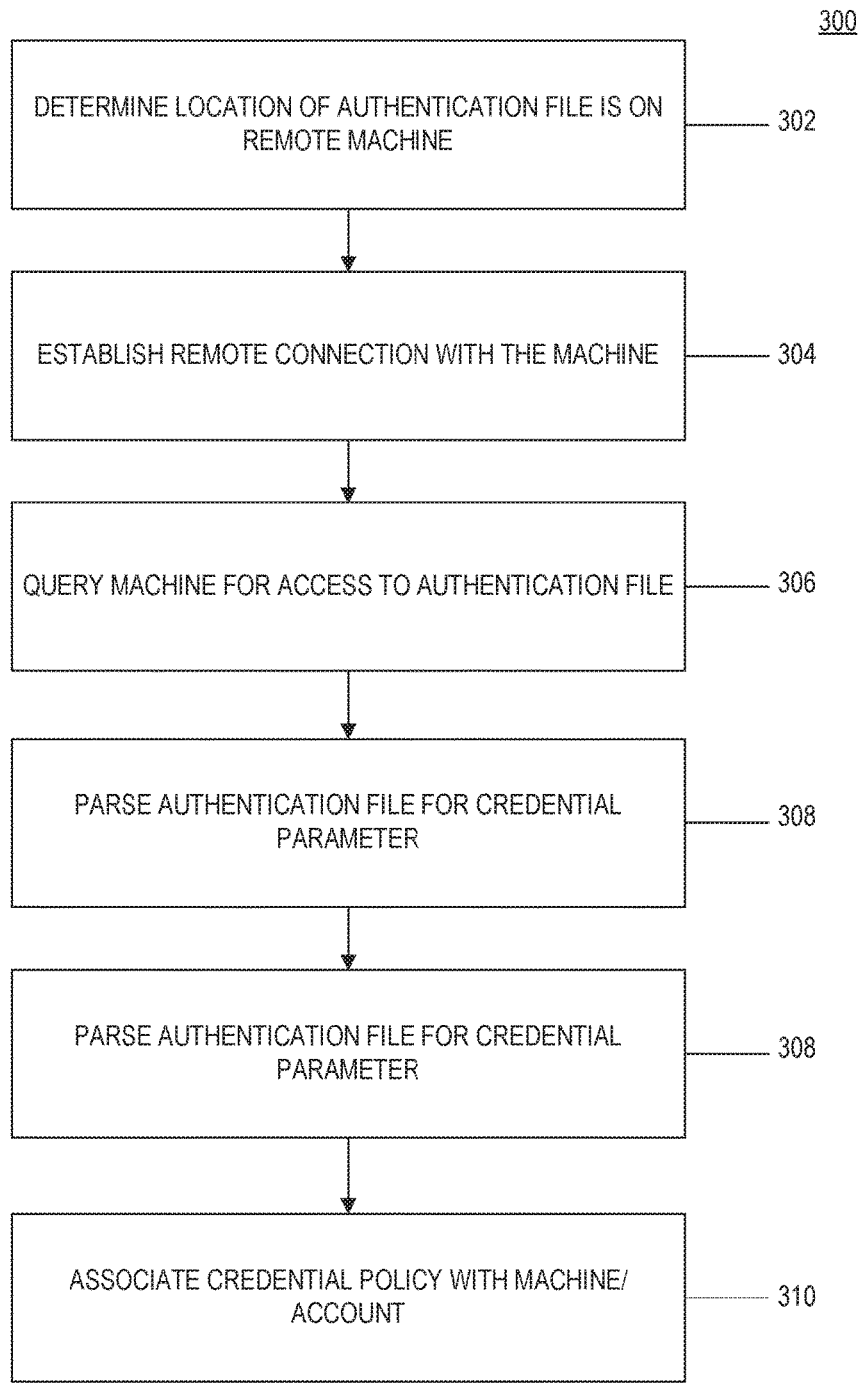
FIG. 3 is a flowchart depicting an example process for determining a credential parameter for an account of a machine, in accordance with disclosed embodiments.

FIG. 3 depicts a flowchart illustrating an example process 300 for accessing or determining a credential parameter for an authentication process for an account of a machine, which may be performed as part of operation 202 of FIG. 2. As part of operation 302, it is determined that the location of an authentication file including one or more credential parameters is on the remote machine. As part of operation 302, credential manager 104 may query CPM 105 and/or database 106 to determine if an authentication file for a particular machine and account on the machine is stored thereon or otherwise known. Alternatively, credential manager 104 may automatically determine to query a remote machine for an authentication file, such as part of an auditing process, for example.

Upon determining to access an authentication file on a remote machine, a remote connection may be established with the machine, as part of operation 304. The remote connection may be established in the same or similar manner as operation 210, and in some cases the connections may be part of the same session. As described with respect to operation 210, the remote connection may be established using a root account or superuser/administrator level account. Responsive to establishing a connection with the machine, as part of operation 306, credential manager 104 may query the machine to access an authentication file stored thereon. In some embodiments, as part of operation 306, credential manager 104 may issue one or more commands targeted at determining the contents or location of the authentication file stored on the remote machine. The one or more commands may be sent to the machine 101 using a command-line interface tool, such as that used to establish the remote connection with the machine. In some embodiments, credential manager 104 may determine the necessary commands for querying the machine to access the authentication file based on information stored and managed for the machine or for an administrator account by querying CPM 105, for example. In some embodiments, the necessary commands may be determined based on a known configuration of the machine or an operating system thereof. In some embodiments, the necessary commands may be determined based on remote interaction with the machine, as similarly described with respect to FIGS. 4 and 5, below.

As part of operation 308, credential manager 104 may parse the authentication file or other prompts and information received responsive to operation 306, to determine one or more credential parameters. The one or more credential parameters may include any one or more requirements for a credential, as discussed above with respect to operation 202. The one or more credential parameters may pertain to each of a plurality of accounts associated with the machine or may be uniquely associated with particular accounts or groups of accounts, such as based on account type or privileges associated with the account type. Responsive to determining the one or more credential parameters associated with the machine and an account of the machine, as part of operation 310, credential manager may determine a credential policy for the machine/account and associate the credential policy and/or the determined credential parameters with an authentication file for the machine and/or account, such as by storing the determined parameters in CPM 105 or database 106 in association with a machine and/or account identifier. The determined credential parameters may also be subsequently used by credential manager 104 to determine one or more credential complexity rules, as described above with respect to operation 204.

Figure 4:
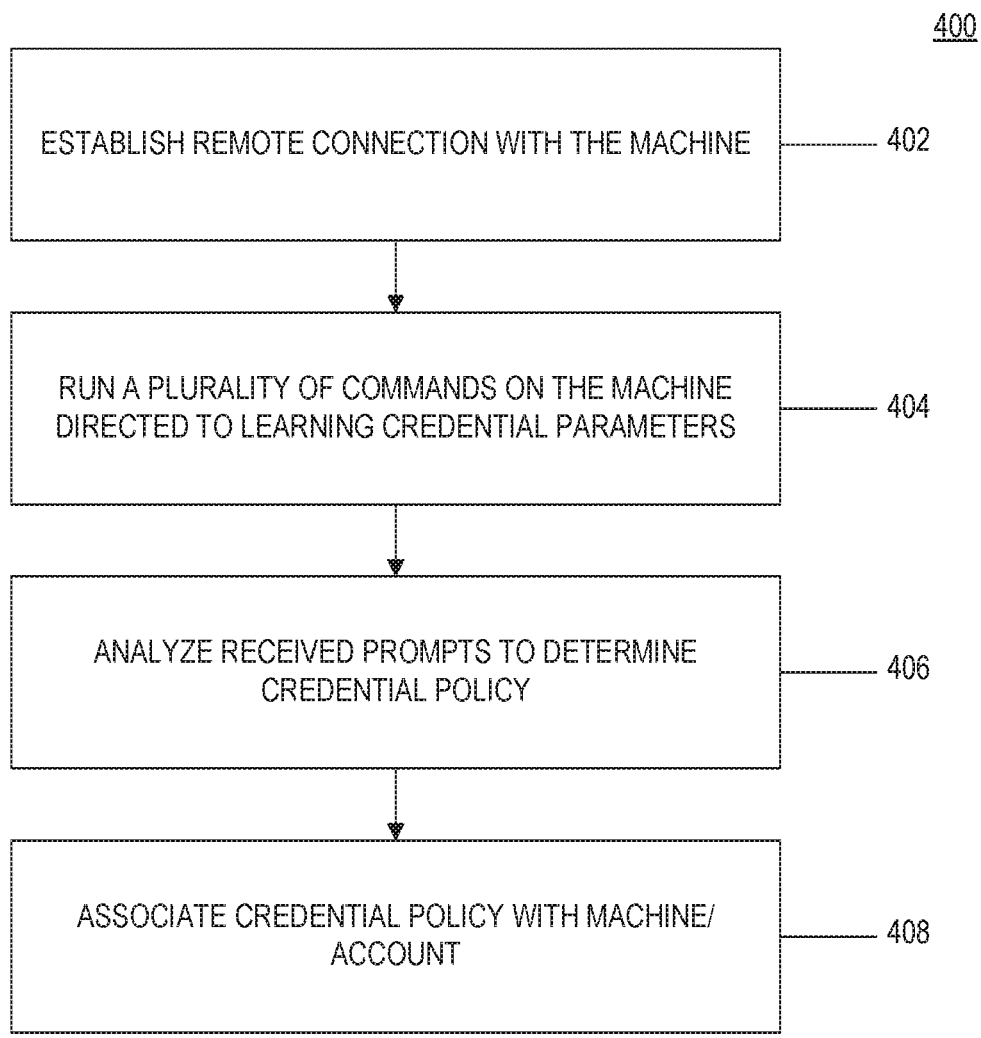
FIG. 4 is a flowchart depicting an example process for determining a credential parameter for an account of a machine, in accordance with disclosed embodiments.

FIG. 4 depicts a flowchart illustrating an example process 400 for accessing or determining a credential parameter for an authentication process for an account of a machine, which may be performed as part of operation 202 of FIG. 2. As shown in FIG. 4, a remote connection may be established with the machine as part of operation 402. The remote connection may be established in the same or similar manner as operation 210 and 304, and in some cases the connections may be part of the same session. As described with respect to operation 210, the remote connection may be established using a root account or superuser/administrator level account. Responsive to establishing a connection with the machine, as part of operation 404, credential manager 104 may run a plurality of commands on the machine directed to learning one or more credential parameters of a credential policy enforced at the machine. The plurality of commands may be sent using a command-line tool for communicating with the remote machine, which may be the same tool used to establish the remote connection with the machine. In the disclosed embodiments, credential manager 104 may include a toolbox or lists of sets of commands particularly directed to discovering information from the remote machine. For example, as part of operation 404, the plurality of commands may be selected from a list or toolbox of commands tailored or directed to learning the one or more credential parameters of a credential policy. The commands may be identified and based on information known about the machine, such as the type of machine and operating system, and/or the accounts and account types associated with the machine. In some embodiments, the commands may be directed to learning about the machine's credential policy for each of a plurality of accounts or account types associated with the machine.

A plurality of prompts are expected to be received responsive to the plurality of commands sent to the machine 101 via the remote connection with the machine. As part of operation 406, the received prompts are analyzed to determine one or more of a plurality of credential parameters of a credential policy of an account of the machine. The received prompts may include one or more credential parameters, or other information from which a credential parameter can be obtained or discerned. In some embodiments, the received prompt may identify an authentication file on the machine that includes one or more credential parameters. In other embodiments, a received prompt may include the contents of an authentication file itself.

A credential policy for the machine and/or account may be determined responsive to determining the one or more credential parameters associated with the machine and an account of the machine. The determined credential parameters may also be subsequently used by credential manager 104 to determine one or more credential complexity rules associated with a credential policy, as described above with respect to operation 204. As part of operation 408, credential manager 104 may associate the determined credential policy and/or credential parameters with an authentication file for the machine and/or account, such as by storing the credential policy, complexity rule or the determined parameters in CPM 105 or database 106 in association with a machine and/or account identifier.

Figure 5:
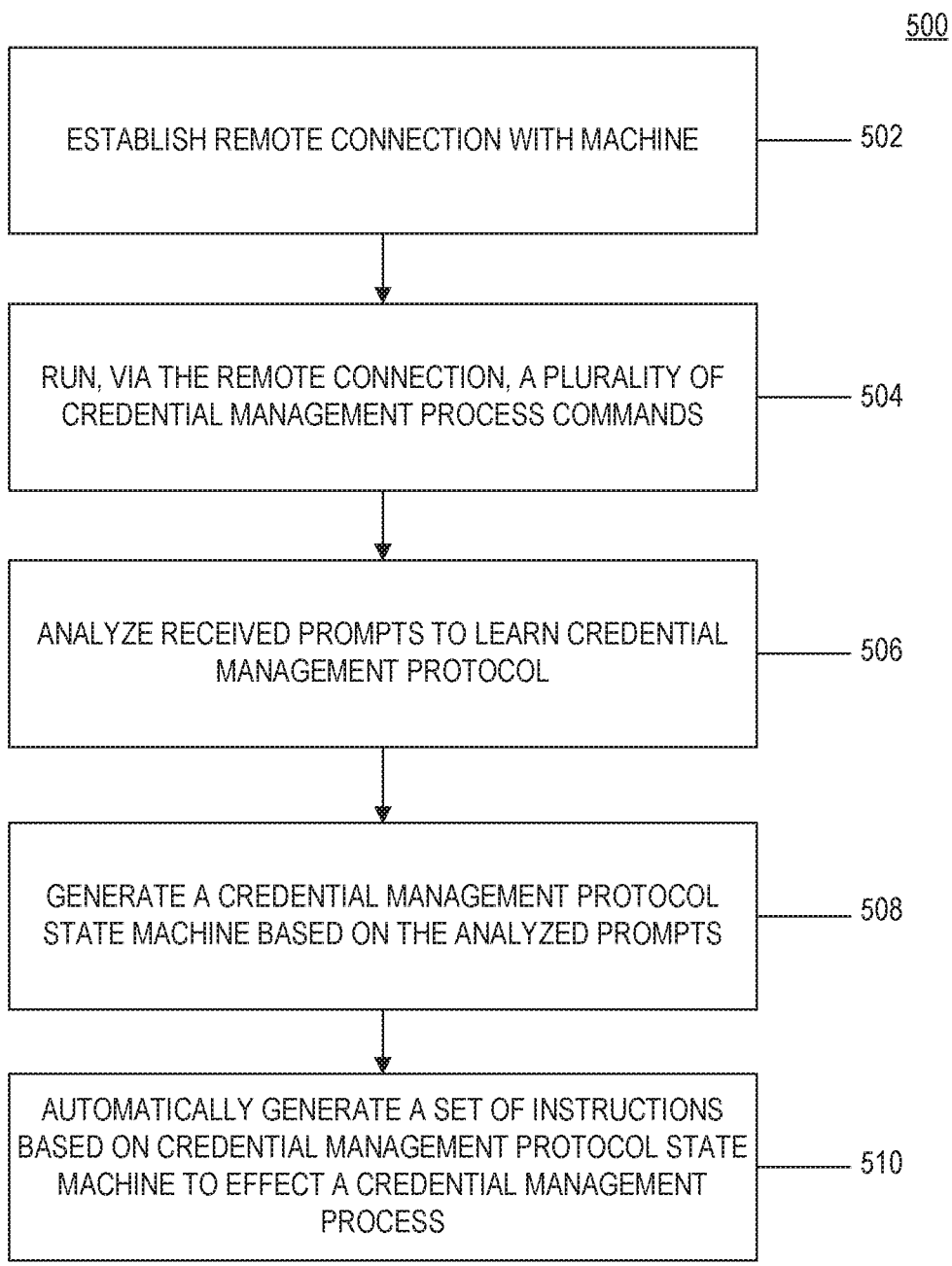
FIG. 5 is a flowchart depicting an example process for determining a credential management protocol for an account of a machine, in accordance with disclosed embodiments.

FIG. 5 depicts a flowchart illustrating an example process 500 for determining a credential management protocol for an account of a machine of a computer system via a remote network connection to the machine. Aspects of process 500 may be performed by or controlled by a credential manager 104. Aspects of process 500 may also be performed as part of operation 206, described above with respect to FIG. 2.

As part of operation 502, a remote connection may be established with a remote machine, such as machine 101. The remote connection may be established using the same tools and techniques described above with respect to operation 210. As also described above, the remote connection may be established using a root account or superuser/administrator level account having certain privileges to access information associated with the machine and/or to make changes to the information on the machine.

As part of operation 504, a plurality of credential management process commands may be run on the remote machine via the remote connection. As described above, the commands may be sent to the remote machine via a command-line interface tool, the same tool of which may be used to establish the remote connection. The plurality of commands may be specific to a particular credential management process and directed to learning the step-by-step process, operations, or commands needed to effect a particular credential management process at the remote machine. That is, in the disclosed embodiments, the protocol for a particular credential management process (e.g., the command flow for changing a password) may be unknown, thus, the plurality of commands are sent to determine the particular protocol based on analyzing received responses to the commands. The credential management process may be any credential management process disclosed herein, including a process for changing a credential or password for an account of the machine, and/or to update a credential policy associated with an account or the machine.

As part of operation 504, credential manager 104 may choose the plurality of commands based on information stored and managed for the machine or an account of the machine. In some embodiments, the plurality of commands may also be based on information about the machine that is learned during or subsequent to establishing the remote connection (e.g., operation 502). In some embodiments, for example, a type or configuration of the machine, as well as a type or configuration of an operating system or other system configurations of the machine may be determined via interaction with the remote machine. Such information may also be determined by querying CPM 105, for example. A plurality of commands may then be determined based on the configuration information known or discovered for the machine, and/or account of the machine. For example, some commands may be particularly directed to machines operating a Unix-based OS, whereas other commands are particularly directed to machines operating a Windows™ OS, etc.

As part of operation 506, the prompts received from the remote machine responsive to each of the plurality of commands are then analyzed to learn a credential management protocol. In some embodiments, a received prompt may be analyzed to determine whether the particular response is consistent with an expected response based on the command sent. In some embodiments, the received prompts are analyzed for any information that can be determined with respect to learning a credential management protocol, etc., whether the response can be said to be expected or not. For example, the received prompts may be analyzed to help determine the next command to be sent to the remote machine.

As part of operation 508, a credential management protocol state machine is generated or updated based on the analysis of the received prompts. For example, in some embodiments, a credential management protocol state machine is generated or updated for those responses determined to be consistent with an expected response. In some embodiments, receipt of an expected response may be indicative of a valid command that may be used to effect any aspect of a credential management process at the remote machine. Both the command that prompted the received response and the received response itself may then be used to generate or update a credential management protocol state machine. In the disclosed embodiments, the credential management protocol state machine defines the particular step-by-step or command-by-command process for completing a particular credential management process at the remote machine. The credential management protocol may be indicative of the commands for effecting a particular credential management process and the sequence or nature of other information needed to complete the credential management process. An example credential management state machine is described below with respect to FIG. 7.

While or after the credential management protocol state machine is being generated, as part of operation 510, a set of instructions may be automatically generated based on the credential management protocol state machine. The set of instructions may be configured to autonomously effect a credential management process at the remote machine via a remote connection with the machine. In some embodiments, the set of instructions may be configured as a script that can be executed autonomously (e.g., without user intervention) by a command-line interface tool, for example, such as the same tool used to establish the remote connection. The set of instructions may be configured to initiate a particular credential management process at the remote machine, as well as perform the other steps (e.g., provide the necessary commands or other information) needed to effect a completed credential management process at the remote machine. The set of instructions, as well as a completed credential management protocol state machine may then be stored and managed by CPM 105, for example, to associate the instructions with the machine and/or account of the machine.

Figure 6:
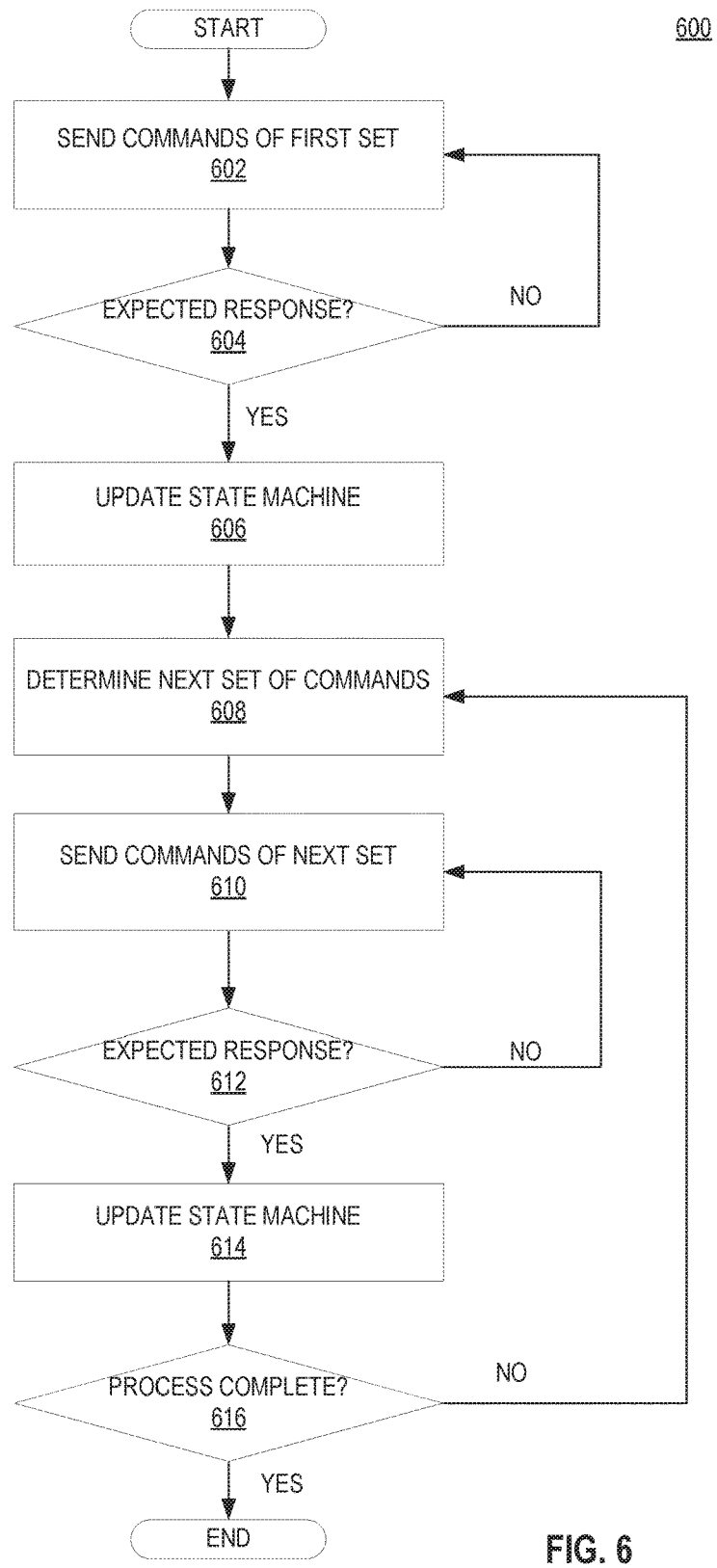
FIG. 6 is a flowchart depicting an example process for determining a credential management protocol state machine for an account of a machine, in accordance with disclosed embodiments.

FIG. 6 illustrates an example process 600 for generating a credential management protocol state machine according to disclosed embodiments. Aspects of process 600 may be performed as operations 504, 506, and 508, described above with respect to FIG. 5.

As part of operation 602, a first set of commands may be selected to run at or send to the remote machine via the remote connection with the machine. The first set of commands may include a plurality of commands directed to initiating a credential management process. In some embodiments, the first set of commands my include commands to determine a credential parameter at the machine, or to identify the accounts or types of accounts of the machine etc. As part of operation 602, a first command of the first set of commands may be sent to the remote machine and a prompt received. As part of operation 604, the prompt is analyzed to determine if the prompt is consistent with a response that is expected for the first command that was sent. If the response is an expected response ("YES") the process may proceed to operation 606 to update or generate a state machine for the credential management process. If the response is not an expected response ("NO") the process returns to operation 602, upon which a next command of the first set will be sent to the remote machine. The next command may be determined based on the prompt received in the prior operation 604. In some embodiments, the next command may be a command from the first set of commands, or alternatively it could be a different command from a new set of commands dictated by the response or prompt received. In the disclosed embodiments, operations 602 and 604 may proceed in iteration until an expected response is received. In some embodiments, process 600 may be triggered to fail after a predetermined threshold of iterations is performed without prompting an expected response.

Once an expected response is received and the state machine is updated (operation 606), the process proceeds to operation 608 where a next set of commands is determined. The next set of commands (or responses, or information) may be determined based on the preceding expected prompt (e.g., a successful operation 604). In some embodiments, the next set of commands may be determined based on one or more prior received prompts, whether expected or not. In operations 610 and 612, a command (or response or information) of the next set is sent to the remote machine and analyzed to determine whether a received prompt or response from the machine is an expected response. Similar to operations 602 and 604, operations 610 and 612 may proceed iteratively until an expected response is received from the remote machine. Again, once an expected response is received in operation 612, the credential management state machine may be updated in operation 614 based on the expected response and the command (or information) that caused the expected response.

In operation 616, it is determined whether the credential management process is complete, or if a credential management protocol state machine for completing a credential management process is complete. In operation 616, completion of the process may be determined based on a response received from the remote machine indicating successful completion of a credential management process. If it is determined that the process is not complete, the process may return to operation 608 to determine the next set of commands or information to send to the remote machine. The process may then continue in such an iterative manner until the process is determined to be complete at operation 616.

Figure 7:
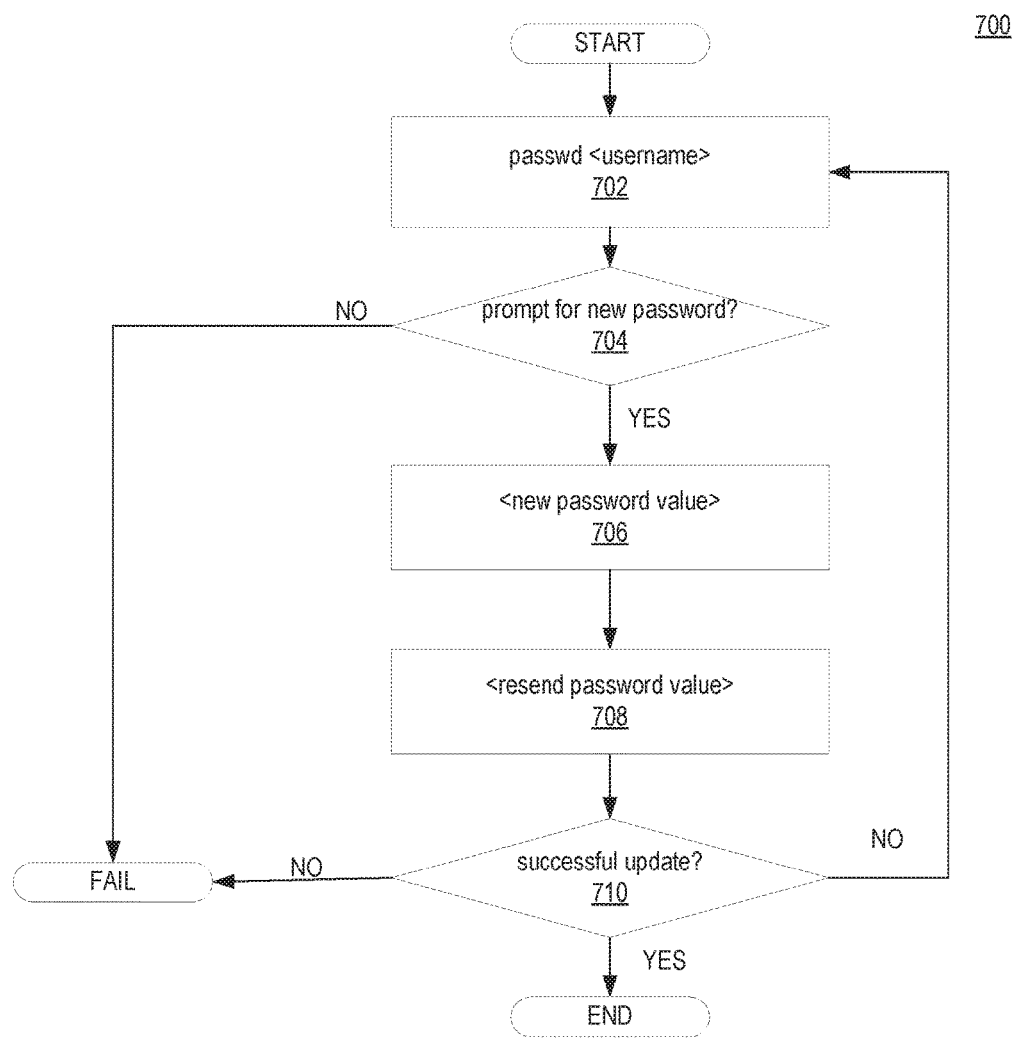
FIG. 7 depicts an example state machine indicative of a process for managing a credential of an account of a machine, in accordance with disclosed embodiments.

FIG. 7 depicts an example state machine 700 indicative of a process for managing a credential of an account of a machine, in accordance with disclosed embodiments. State machine 700 corresponds to a process for changing a password for an account at remote machine, consistent with disclosed embodiments. The processes of state machine 700 may, for example, have resulted from successful performance of process 600 described with respect to FIG. 6 above.

A first process or state 702 of state machine 700 indicates a command "passwd" for initiating a password change operation at a particular remote machine. In this example, the "passwd" command is to be followed by a username of the account at the machine for which the password is to be changed. Following input of the passwd command and a username, a response or prompt is expected to be received from the remote machine indicating initiation of a password change operation. State 704 indicates that if a prompt for a new password is not received from the remote machine then the credential management process failed. In some embodiments, the process may fail, for example, if the username entered is not associated with a username of an account on the machine, or if the account that logged into the remote machine does not have privileges for changing a password of the indicated account. The operation may fail for other reasons as well.

If the appropriate or expected response is received from the remote machine requests input for a new password, then the state machine proceeds to state 706, which requires input of a new password value. As described herein, the new password value may require a password meeting one or more particular credential complexity rules, such as those described with respect to operation 204. In the disclosed embodiments, the new password value may be generated automatically to conform to the password complexity rule determined for the account.

State 708 requests input to resend the password value that was sent in state 706. In the disclosed embodiments, the generated password may be resent to the remote machine. Then in state 710, it is determined whether the response or prompt received from the remote machine is indicative of a successful update. If the password is not successfully updated then the process failed. In some embodiments, the process may be repeated by returning to state 702 to retry the password change operation.

Figure 8:
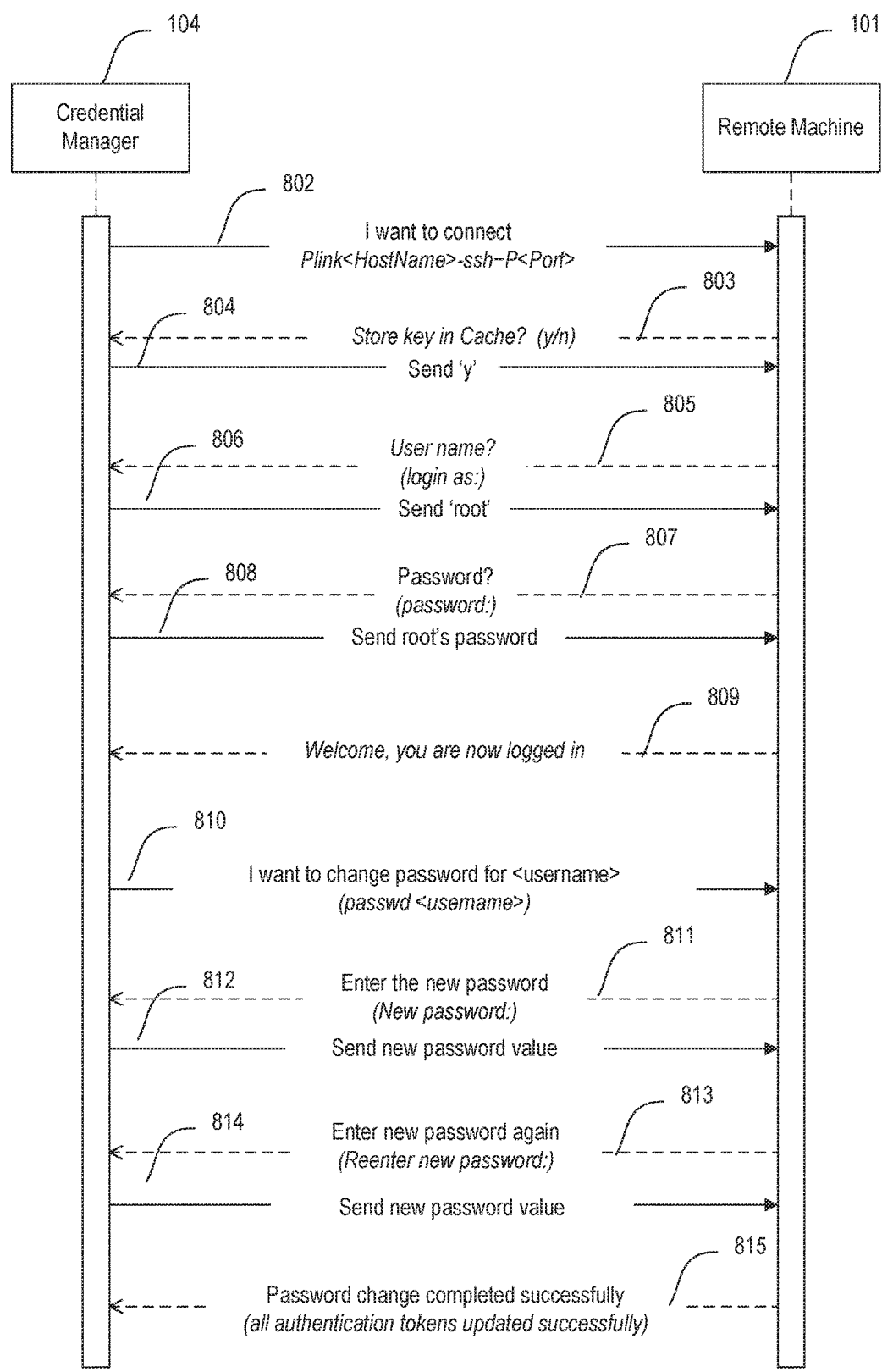
FIG. 8 depicts an example sequence of events for changing a password at a remote machine, in accordance with disclosed embodiments.

FIG. 8 depicts an example sequence of events for changing a password at a remote machine, in accordance with disclosed embodiments. The sequence of events shown may correspond to the sequence of events occurring based on a password change operation of the state machine shown in FIG. 7 and an operation for establishing a remote connection with a remote machine 101 as described with respect to operation 210, for example.

As shown, a first sequence 802 corresponds to a command entered by credential manager 104, for example, for connecting to remote machine 101. The command 802 includes a command Plink<HostName>-ssh-P<Port> for establishing the connection using the Plink command-line connection tool, wherein HostName and Port correspond to an identifier and port for the remote machine 101. As described throughout, the HostName may identify any machine 101 of computer system 108, and may include an IP address or a logical name of the remote machine, for example. Further, as discussed above, alternative remote connection protocols may be used instead of Plink.

In sequence 803, the remote machine 101 responds with a query asking whether to "Store key in Cache? (y/n)." Based on the received response 803, it is determined that an appropriate response is to return a 'y' or 'n', which is returned in sequence 804.

In sequence 805, the remote machine 101 requests a user name for logging into to the remote machine by sending the response "login as:". Based on the received response 805, it is determined that credential manager 104 is to log on using a "root" account, and thus returns 'root' in sequence 806.

In sequence 807, the remote machine 101 requests a password from the credential manager by sending the response "password:". Based on the received response 807, credential manager 104 returns a password for the root account in sequence 808. Upon successful completion of the remote logon procedure, remote machine 101 may return a response "Welcome, you are now logged in" at sequence 809, which indicates successful completion of a remote connection with the remote machine 101. Credential manager 104 is now connected to the remote machine 101. In some embodiments, sequences 802 to 808 for establishing a remote connection may be performed autonomously by credential manager 104, which upon successful connection may also autonomously send one or more commands to remote machine for performing or initiating a process of the disclosed embodiments.

For example, at sequence 810, credential manager 104, running a set of instructions (e.g., a script or other program) generated in operation 510, may send a command "passwd <username>" indicating to the remote machine a desire to change the password for <username>. The "passwd" command and a particular username may have been learned from interaction with the remote machine, as described with respect to FIGS. 5 and 6, for example.

In sequence 811, remote machine 101 returns a prompt "New password:" requesting entry of a new password from the credential manager 104. Credential manager 104 then automatically responds with a new password value of sequence 812. The new password value may be a password automatically generated in operation 208 described in FIG. 2. In sequence 813, remote machine 101 responds with a prompt to "Reenter new password:", responsive to which credential manager 104 then resends the new password value in sequence 814.

Credential manager 104 then determines whether the response received from remote machine 101 in sequence 815 indicates that the password change process completed successfully, such as based on receipt of a response of "all authentication tokens updated successfully." As part of the sequence of exchanges, the password for the account associated with the username entered in sequence 810 will have changed at the remote machine 101. In some embodiments, the newly entered password may replace an existing password associated with the username in an authentication file stored locally at the remote machine for authenticating accounts of the machine.

FIG. 9 is a flowchart depicting an example process 900 for updating a credential policy for an account of a machine, in accordance with disclosed embodiments. As described above, the disclosed processes may also be used to change, modify, or update one or more aspects of a credential complexity rule associated with a credential policy enforced at a machine 101. It may be advantageous, for example, to enable automatic updates to one or more credential complexity rules at a plurality of machines, or to automatically configure a credential complexity rule for a machine that may not have a credential policy enforced on the machine. In some embodiments, the credential complexity rules may be tailored for particular types of machines, or accounts or account types or privileges associated with an account type, associated with the machine. Thus, the disclosed embodiments enable automatic management of a plurality of different credential policies or credential complexity rules for different accounts on different machines.

As part of operation 902, it may be determined that the password complexity rule determined for a machine and/or account of the machine in operation 204, for example, may not be consistent with a policy for the computer system 108. The policy for the computer system may be predetermined for one or more accounts, account types, or machines. In some embodiments, the password complexity rule may be dynamically updated to respond to a threat or vulnerability in the computer system 108, for example. In some embodiments, the determined password complexity rule may not be consistent with an enterprise policy for the type of account or the privileges associated with the account, or it may not be consistent with an enterprise policy for the nature of the resources accessible via the account. In some embodiments, where a determination is made that a machine lacks enforcement of a credential complexity rule, the lack of such a rule may be considered as being not consistent with policy.

In operation 904, a remote connection may be established with the machine. The remote connection may be established in the same manner as operation 210 and as described throughout. The remote connection established in 904 may also be part of an existing remote connection, such as that established in operation 210, 304, 402, and 502.

In operation 906, an authentication file at the remote machine may be updated with a new or updated credential complexity rule. In some embodiments, the credential complexity rule may be updated by modifying at least one credential parameter of an authentication file at the machine, such as the one or more credential parameters determined in operation 308. In the disclosed embodiments, the particular commands and information needed to complete such an update or change to an authentication file may be determined as part of operation 500 when the credential management process corresponds to the process for updating a credential complexity rule, for example. Upon successful update of the authentication file, as part of operation 908 the updated credential complexity rule may be stored in association with the machine and/or account in the CPM 105 or database 106, for example.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant credential manager or credential manager-like components and systems, and machines, and remote connection protocols and tools, etc. will be developed and the scope of the these and other described terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the appended claims.

What is claimed is:

1. A method for managing an authentication credential of an identity of a machine of a computer system via a remote network connection with the machine, the method comprising:
    accessing in the computer system, at least one credential parameter for an authentication process for the identity of the machine, the at least one credential parameter being included in an authentication file associated with the computer system;
    determining a password complexity rule for the identity based at least on the at least one accessed credential parameter, thereby enabling automatic generation of a password consistent with the determined password complexity rule for a user associated with the identity of the machine;
    determining a credential management protocol, based on interaction with the machine via the remote network connection; and
    performing a security control operation for the identity based at least on the credential management protocol, the security control operation including at least one of:
        enabling updating a password associated with the identity at the machine based on the automatically generated password;
        enforcing a password change operation for the identity at the machine;
        determining whether the password associated with the identity complies with a security policy; or
        determining whether the determined password complexity rule complies with the security policy.

2. The method of claim 1, further comprising:
    generating a password consistent with the determined password complexity rule for the user associated with the identity of the machine, the generated password being configured to enable the user to access at least one access-controlled resource associated with the machine;
    establishing a remote network connection with the machine; and
    interacting with the machine, via the remote network connection, thereby updating a previous password of the identity of the machine with the generated password based on the determined credential management protocol.

3. The method of claim 1, wherein the at least one credential parameter is included in the authentication file, the method further comprising querying from the machine, via the remote network connection, the at least one credential parameter.

4. The method of claim 2, further comprising storing the generated password on the machine and modifying the authentication file to replace the previous password with the generated password.

5. The method of claim 3, further comprising:
    determining whether the password complexity rule is consistent with a predetermined password complexity policy; and
    when the password complexity rule is not consistent with the predetermined password complexity policy, modifying, via the remote network connection, at least one accessed credential parameter included in the authentication file, thereby modifying the password complexity rule.

6. The method of claim 1, wherein establishing the remote network connection includes accessing the machine using a root identity.

7. The method of claim 1, wherein the password complexity rule identifies at least one minimum requirement of the password associated with the identity, including a requirement for a minimum number of characters, digits, uppercase characters, lowercase characters, or valid special characters.

8. The method of claim 1, further comprising determining a plurality of identity types of the machine, each identity type having different privileges in the computer system.

9. The method of claim 8, further comprising determining a password complexity rule for each of the plurality of identity types of the machine.

10. The method of claim 9, further comprising modifying a password complexity rule for at least one of the plurality of identity types based on the privileges associated with the at least one of the plurality of identity types.

11. The method of claim 1, wherein the user is a human or an automated application.

12. The method of claim 1, wherein the identity is an account associated with the machine.

13. A non-transitory computer readable medium including instructions that, when executed by at least one processor, cause the at least one processor to perform operations for managing an authentication credential of an identity of a machine of a computer system via a remote network connection with the machine, the operations comprising:
- accessing in the computer system, at least one credential parameter for an authentication process for the identity of the machine, the at least one credential parameter being included in an authentication file associated with the computer system;
- determining a password complexity rule for the identity based at least on the at least one accessed credential parameter, thereby enabling automatic generation of a password consistent with the determined password complexity rule for a user associated with the identity of the machine;
- determining a credential management protocol, based on interaction with the machine via the remote network connection; and
- performing a security control operation for the identity based at least on the credential management protocol, the security control operation including at least one of:
  - enabling updating a password associated with the identity at the machine based on the automatically generated password;
  - enforcing a password change operation for the identity at the machine;
  - determining whether the password associated with the identity complies with a security policy; or
  - determining whether the determined password complexity rule complies with the security policy.

14. The non-transitory computer readable medium of claim 13, wherein the operations further comprise:
- generating a password consistent with the determined password complexity rule for the user associated with the identity of the machine, the generated password being configured to enable the user to access at least one access-controlled resource associated with the machine;
- establishing a remote network connection with the machine; and
- interacting with the machine, via the remote network connection, thereby updating a previous password of the identity of the machine with the generated password based on the determined credential management protocol.

15. The non-transitory computer readable medium of claim 13, wherein the at least one credential parameter is included in the authentication file, and the operations further comprise querying from the machine, via the remote network connection, the at least one credential parameter.

16. The non-transitory computer readable medium of claim 14, wherein the operations further comprise storing the generated password on the machine and modifying the authentication file to replace the previous password with the generated password.

17. The non-transitory computer readable medium of claim 15, wherein the operations further comprise:
- determining whether the password complexity rule is consistent with a predetermined password complexity policy; and
- when the password complexity rule is not consistent with the predetermined password complexity policy, modifying, via the remote network connection, at least one accessed credential parameter included in the authentication file, thereby modifying the password complexity rule.

18. The non-transitory computer readable medium of claim 13, wherein establishing the remote network connection includes accessing the machine using a root identity.

19. The non-transitory computer readable medium of claim 13, wherein the password complexity rule identifies at least one minimum requirement of the password associated with the identity, including a requirement for a minimum number of characters, digits, uppercase characters, lowercase characters, or valid special characters.

20. The non-transitory computer readable medium of claim 13, wherein the operations further comprise determining a plurality of identity types of the machine, each identity type having different privileges in the computer system.

21. The non-transitory computer readable medium of claim 20, wherein the operations further comprise determining a password complexity rule for each of the plurality of identity types of the machine.

22. The non-transitory computer readable medium of claim 21, wherein the operations further comprise modifying a password complexity rule for at least one of the plurality of identity types based on the privileges associated with the at least one of the plurality of identity types.

23. The non-transitory computer readable medium of claim 13, wherein the user is a human or an automated application.

* * * * *